(12) United States Patent
Neef

(10) Patent No.: US 11,938,434 B2
(45) Date of Patent: Mar. 26, 2024

(54) FILTER ELEMENT AND FILTER SYSTEM

(71) Applicant: MANN+HUMMEL GmbH, Ludwigsburg (DE)

(72) Inventor: Pascal Neef, Trossingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 613 days.

(21) Appl. No.: 16/999,402

(22) Filed: Aug. 21, 2020

(65) Prior Publication Data

US 2020/0376425 A1    Dec. 3, 2020

Related U.S. Application Data

(63) Continuation of application No. PCT/EP2019/054395, filed on Feb. 22, 2019.

(30) Foreign Application Priority Data

Feb. 23, 2018   (DE) .......................... 102018001436.4

(51) Int. Cl.
*B01D 46/24* (2006.01)
*B01D 29/21* (2006.01)
(Continued)

(52) U.S. Cl.
CPC ......... *B01D 46/2414* (2013.01); *B01D 29/21* (2013.01); *B01D 35/30* (2013.01);
(Continued)

(58) Field of Classification Search
CPC .... B01D 46/2414; B01D 29/21; B01D 35/30; B01D 46/521; B01D 2201/291; B01D 2201/301; B01D 2201/4053; B01D 2265/026; B01D 2275/206; B01D 2275/208; B01D 46/009
(Continued)

(56) References Cited

U.S. PATENT DOCUMENTS 10,384,158 B2    8/2019  Pflueger et al.
2010/0263338 A1  10/2010 Bannister et al.
(Continued)

FOREIGN PATENT DOCUMENTS

CN    204610087 U    9/2015
DE    10135080 A1    1/2003
(Continued)

*Primary Examiner* — Madeline Gonzalez

(57) ABSTRACT

A filter element has a filter bellows of filter medium laid into folds. The folds extend between oppositely positioned end edges of the filter bellows, respectively. The end edges form oppositely positioned end edge surfaces. The filter bellows is arranged in closed configuration about a longitudinal axis and encloses a hollow space. The filter bellows has opposed end faces sealed by an end disc. The filter bellows has a cut portion in at least one of the oppositely positioned end edge surfaces such that one or more regions of folds with shortened fold length are formed. A fold length of the folds with shortened fold length is substantially identical at an outer and inner circumference of the filter bellows. A filter system has a housing in which the filter element is arranged. One of the housing parts has a region corresponding to the cut portion of the filter bellows.

21 Claims, 9 Drawing Sheets

(51) Int. Cl.
  *B01D 35/30* (2006.01)
  *B01D 46/52* (2006.01)
(52) U.S. Cl.
  CPC ...... *B01D 46/521* (2013.01); *B01D 2201/291* (2013.01); *B01D 2201/301* (2013.01); *B01D 2201/4053* (2013.01); *B01D 2265/026* (2013.01); *B01D 2275/206* (2013.01); *B01D 2275/208* (2013.01)
(58) Field of Classification Search
  USPC .. 210/232, 493.1, 493.2, 450, 497.01, 493.5
  See application file for complete search history.

(56) References Cited

U.S. PATENT DOCUMENTS

| | | |
|---|---|---|
| 2012/0181224 A1 | 7/2012 | Rapin |
| 2016/0263513 A1* | 9/2016 | Pflueger ............. F02M 35/0245 |
| 2016/0263514 A1* | 9/2016 | Epli ................... B01D 46/2414 |
| 2018/0339253 A1 | 11/2018 | Karlsson et al. |

FOREIGN PATENT DOCUMENTS

| | | |
|---|---|---|
| DE | 102016010101 A1 | 3/2018 |
| JP | H01163513 U | 6/1989 |

* cited by examiner

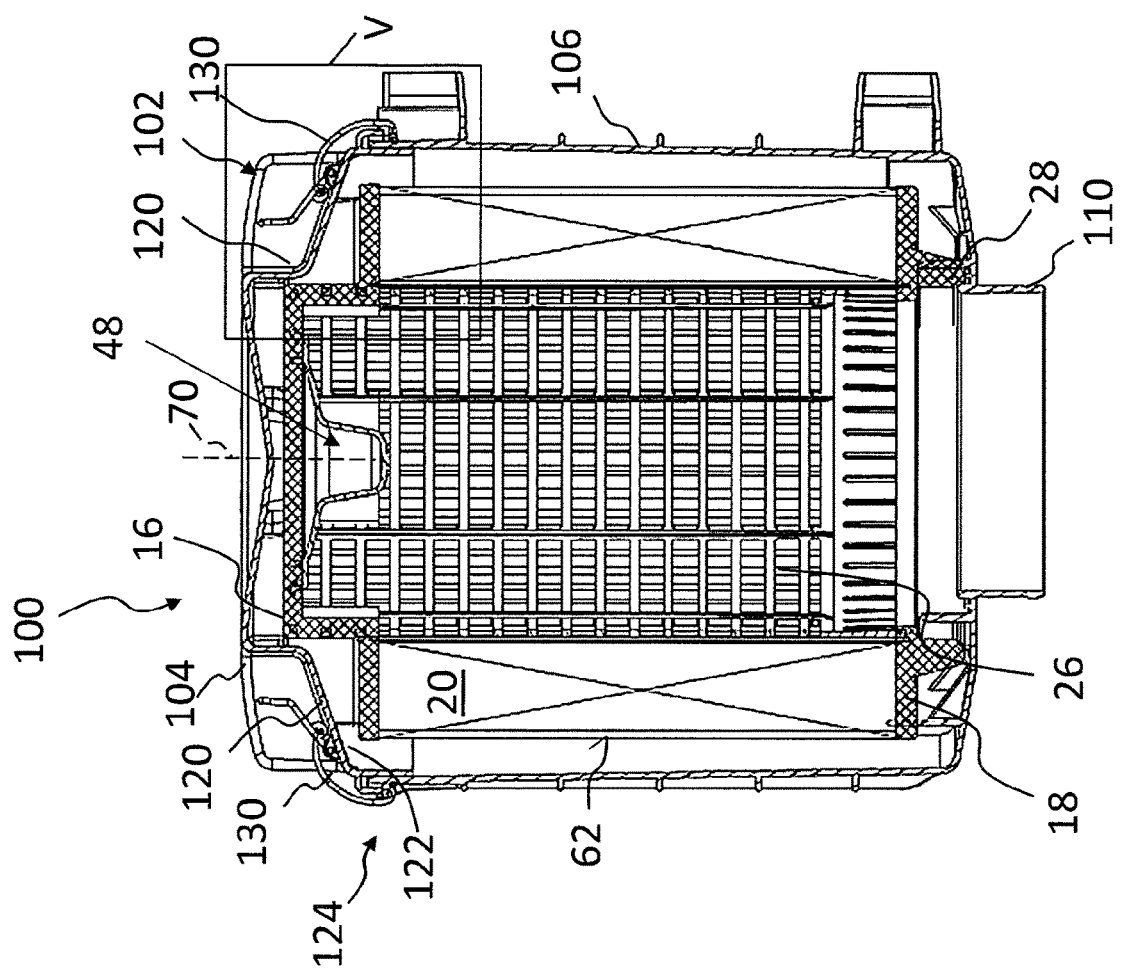
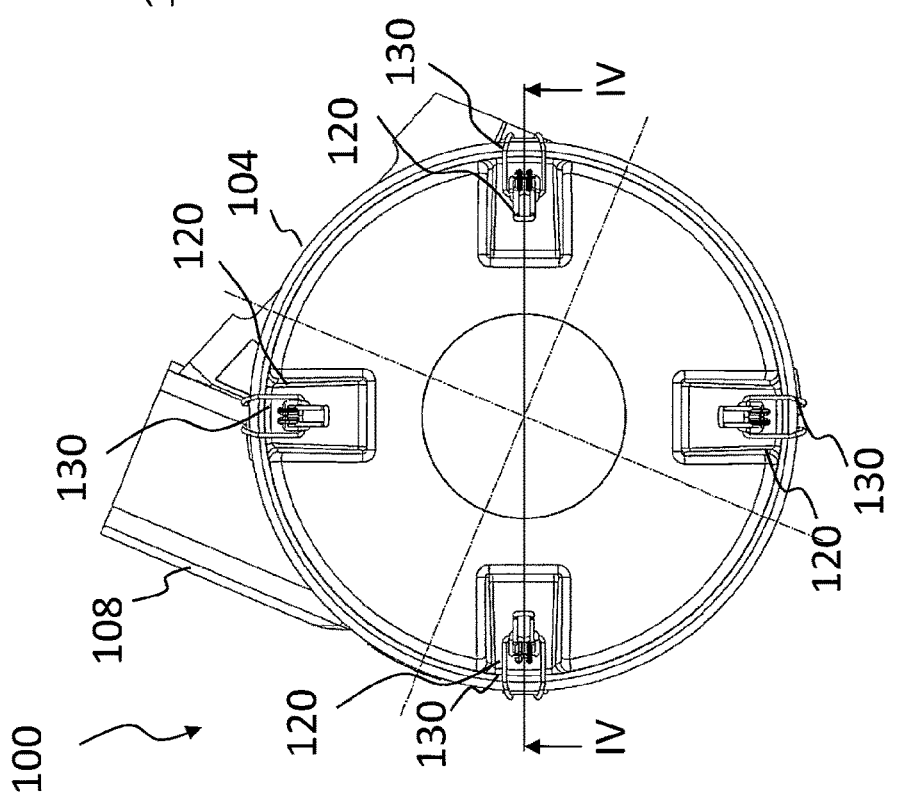

FILTER ELEMENT AND FILTER SYSTEM

CROSS-REFERENCE TO RELATED APPLICATIONS

This application is a continuation application of international application No. PCT/EP2019/054395 having an international filing date of 22 Feb. 2019 and designating the United States, the international application claiming a priority date of 23 Feb. 2018 based on prior filed German patent application No. 10 2018 001 436.4, the entire contents of the aforesaid international application and the aforesaid German patent application being incorporated herein by reference.

BACKGROUND OF THE INVENTION

The invention concerns a filter element and a filter system, in particular for the intake air of an internal combustion engine, in particular of a motor vehicle.

DE 10 2014 016 908 discloses a round filter element in which the end edge surface of the round filter element relative to the longitudinal axis of the round filter element is slanted in a semi-circular region of the end edge surface with reduction of the filter surface. The filter bellows is arranged on a correspondingly matched slanted support tube. An unequivocal orientation of the filter bellows in the filter housing is provided due to the slanted region of the end edge surface at the element.

SUMMARY OF THE INVENTION

An object of the invention is to provide a filter element that can be installed non-confusably in a filter housing and that makes available a filter surface as large as possible.

A further object of the invention is to provide a filter system with such a filter element.

The aforementioned objects are solved according to an aspect of the invention with a filter element with a round filter bellows of a filter medium with a circular or oval cross section, which is laid into folds in the filter bellows along fold edges which extend between oppositely positioned end edges of the filter bellows, respectively, wherein the filter bellows is arranged in a closed configuration about a longitudinal axis and encloses a hollow space and is sealed at its two end faces by an end disc, respectively, wherein the filter bellows comprises a cut portion in at least one of its end edge surfaces such that at least one region of folds with shortened fold length is formed whose fold length is substantially identical at the outer circumference and at the inner circumference of the filter bellows.

The object is solved according to a further aspect of the invention by a filter system with a housing with inlet and outlet for a fluid and with a first and a second housing part, wherein in the housing a filter element is arranged with a filter bellows that is arranged in a closed configuration about a longitudinal axis, which is sealed at its two end faces by an end disc, respectively, wherein the filter bellows comprises a cut portion in at least one of its end edge surfaces such that at least one region of folds with shortened fold length is formed whose fold length, at least in sections, is substantially identical at the outer circumference and at the inner circumference of the filter bellows, and wherein at least one of the housing parts comprises at least one region which is embodied corresponding to the cut portion of the filter element.

Beneficial configurations and advantages of the invention results from the further claims, the description, and the drawing.

A filter element is proposed with a filter bellows of a filter medium which is laid into folds, in particular in a zigzag shape, along fold edges in the filter bellows, which folds extend between oppositely positioned end edges of the filter bellows, respectively. The filter bellows is arranged in a closed configuration about a longitudinal axis and encloses a hollow space and is sealed at its two end faces by an end disc, respectively. The filter bellows comprises a cut portion in at least one of its end edge surfaces such that at least one region of folds with shortened fold length is formed whose fold length is substantially identical, at least in sections, at the outer circumference and at the inner circumference of the filter bellows.

A cut portion can be provided at one end face of the filter bellows but also at both sides. The fold length in the region of shortened fold length being identical at the exterior and at the interior means that an angle between the longitudinal axis of the filter element and the fold edges in the region of shortened fold length is substantially a right angle. Optionally, some of the folds within the region can comprise end edges that are arranged at a slant relative to the longitudinal axis. For example, within the region, the end edges can be oriented at its rims perpendicular to the longitudinal axis and slanted at the middle.

Advantageously, one or a plurality of regions with folds of shortened fold length can be provided so that only a small portion of the filter surface is eliminated thereat by the reduced length extension of the filter bellows. Particularly beneficially, the central tube can remain unchanged so that the filter element can be supported across its entire length extension. Preferably, less than 50% of the end edge surfaces of the filter bellows have folds with shortened fold length.

The filter bellows can be cut preferably by means of laser cutting prior to or after erecting the folds.

The end folds in the meaning of the invention are the two outer folds at oppositely positioned ends of the filter bellows. The end rims are the two free rims of the filter medium which extend along the end folds and delimit them at the ends of the filter bellows. The end edges of the filter bellows are the two other free rims of the filter bellows extending between the end rims and running in accordance with the folding of the filter bellows. The fold edges are the edges along which the filter medium is folded. In case of an approximately parallelepipedal filter bellows available on the market and folded in a zigzag shape, the end rims and the fold edges in general are straight and extend parallel to each other. The end edges extend, viewed from the side of the filter bellows, in a zigzag shape and perpendicular to the end rims and the fold edges. Prior to folding the filter medium, the end edges of the filter bellows, which later on will have an approximately parallelepipedal virtual envelope, extend straight and parallel to each other. The virtual envelope is defined by the end edges, the neighboring fold edges or end rims at a clean fluid side of the filter bellows, and the neighboring fold edges or end rims at the raw fluid side.

In filter bellows of round filter elements, the filter media are of a closed configuration, meaning that their end folds are connected to each other. Filter bellows of round filter elements can comprise in this context circular cross sections but also other cross-sectional shapes of closed configuration, for example, elliptical cross sections.

Advantageously, the closed end disc can comprise support ribs with which the filter element is supported against the housing. They can be provided on a flat end face of the end disc. Optionally, a support can be realized such that support elements are provided in the cutouts. This enables a shortened height of the filter element. As needed, corresponding counter elements for the support elements in the cutouts of the filter element can be arranged in a corresponding housing part. According to a beneficial embodiment, the end edges of the folds can be positioned in a planar surface in the region of folds with shortened fold length. Preferably, the end edges of the folds with shortened fold length can be positioned in the filter bellows in a cutout that extends away from the end edge surface and has a planar bottom. This geometry can be produced in a simple way.

According to a beneficial embodiment, the end edges of the folds can be positioned in a curved surface in the region of folds with shortened fold length. Preferably, the end edges of the folds with shortened fold length can be positioned in a concave cutout that extends away from the end edge surface. Concave refers to a recess or cutout that, extending away from the usually flat end face of a filter bellows, protrudes into the filter bellows so that the end face which is formed by the zigzag-shaped course of the end edges is locally recessed. The cutout can be rounded or square, for example, semicircular, polygonal, quadrangular, trapezoidal or triangular. The cutout can have, for example, a shape that generates an association of a piece bitten out of the filter bellows, i.e., a bite-shaped form. The geometry of one or a plurality of cutouts can be selected as needed. In particular, laser cutting enables a large degree of freedom when cutting the cutouts into the filter bellows.

According to a beneficial embodiment, cutouts with folds of shortened fold length and folds with unshortened fold length can follow each other alternatingly in the filter bellows. In case of installation in a filter housing of a filter system, this enables a positionally oriented and non-confusable installation for a poka yoke assembly.

The housing cover can be designed so as to correspond to the cutouts. This enables an arrangement of closures between housing parts that is beneficial with regard to installation space, in particular in case of tight installation space, which is often the case in the automotive field.

According to a beneficial embodiment, in the filter bellows a single cutout with folds of shortened fold length can be arranged within the medium. The embodiment of the filter bellows can be adapted as needed.

According to a beneficial embodiment, the filter bellows can have an annular cross section. Alternatively, the filter bellows can have an oval cross section or a different cross section.

According to a further aspect of the invention, a filter system is proposed, in particular for a filter element according to the invention, with a housing with an inlet and an outlet for a fluid, in particular of an internal combustion engine, in particular of a motor vehicle, and with a first and a second housing part, wherein in the housing a filter element is arranged, with a filter bellows of a filter medium which is laid into folds, in particular in a zigzag shape, along fold edges in the filter bellows, which extend between oppositely positioned end edges of the filter bellows, respectively. The filter bellows is arranged in a closed configuration about a longitudinal axis and encloses a hollow space and is sealed at its two end faces by an end disc, respectively. The filter bellows comprises a cut portion in at least one of its end edge surfaces so that at least one region of folds with shortened fold length is formed whose fold length is substantially identical at the outer circumference and at the inner circumference of the filter bellows. At least one of the housing parts comprises at least one region which comprises a corresponding recess relative to the cut portion of the filter element.

Due to the corresponding embodiment, for example, of the housing cover that can be arranged, for example, across the end face of the filter element with cut portion, recesses can be embodied in the housing cover which form bulges at its inner side that can engage the cutouts of the filter element. Filter element and housing cover can be positioned in correct position relative to each other. Moreover, the recesses can serve to receive closure elements so that the latter can be comfortably operated even in case of tight installation space. Also, the closure elements in the closed state of the filter housing advantageously do not additionally protrude, or hardly protrude, past an envelope of the filter housing. Advantageously, the end disc is matched to the structure at the end face of the filter element. Particularly beneficially, this is accomplished with a foamed polymer, in particular a polyurethane, as end disc material.

According to a beneficial embodiment, the filter element can be arranged about a support tube which has along its circumference a constant axial extension. In particular, the support tube can be designed without being shortened in the region with shortened fold length. Advantageously, a complete support of a central region of the filter element can be ensured completely by the continuous support tube.

According to a beneficial embodiment, the cut portion can be arranged at an end of the filter element with closed end disc. Alternatively or additionally, the cut portion can be arranged at an end of the filter element with open end disc. Configurational freedom to match a need is possible.

The open end disc comprises a preferably coaxial flow opening which is used preferably as outflow opening. Further preferred, the open end disc in the region of the flow opening comprises a seal, preferably a radial seal and alternatively an axial seal for seal-tight connection with a housing-associated outlet. The seal can be preferably embodied as one piece together with the end disc, for example, cast from polyurethane.

According to a beneficial embodiment, in the housing part which is facing the cut end face of the filter element, at least one bulge at an inner side of the housing part can engage in at least one cutout at the filter element. This enables a simple position-oriented positioning between housing part and filter element. The housing part can preferably be the housing cover and/or the housing bottom.

According to a beneficial embodiment, a closure element, in particular a snap hook or wire clasp closure, can be arranged in an exterior depression of the housing part which forms a corresponding interior bulge. In particular, the closure element in the closed state of the housing can be substantially immersed in the recess. Advantageously, a pivotable element of the closure element can be accommodated in the recess where it is arranged in a space-saving and easily accessible way.

According to a beneficial embodiment, a separation plane between first and second housing part can be arranged substantially at the axial level of cutouts in the filter element. This enables an easy accessibility of the housing cover in case of tight installation space.

For example, the filter system is an air filter system, in particular an air filter system for an internal combustion engine, preferably an air filter system for an internal combustion engine of a motor vehicle. Alternatively, the filter system is a liquid filter system for liquid fluids, for example, oil or fuel, in particular a liquid filter system for an internal combustion engine, preferably a liquid filter system for an internal combustion engine of a motor vehicle.

BRIEF DESCRIPTION OF THE DRAWINGS

Further advantages results from the following drawing description. In the drawings, embodiments of the invention are illustrated. The drawings, the description, and the claims contain numerous features in combination. A person of skill in the art will consider the features expediently also individually and combine them to expedient further combinations.

FIG. 3 shows the filter system of FIG. 1 in a plan view.

FIG. 4 shows the filter system in FIG. 1 as a longitudinal section along the section plane IV-IV in FIG. 3.

DESCRIPTION OF PREFERRED EMBODIMENTS

Figure 2:
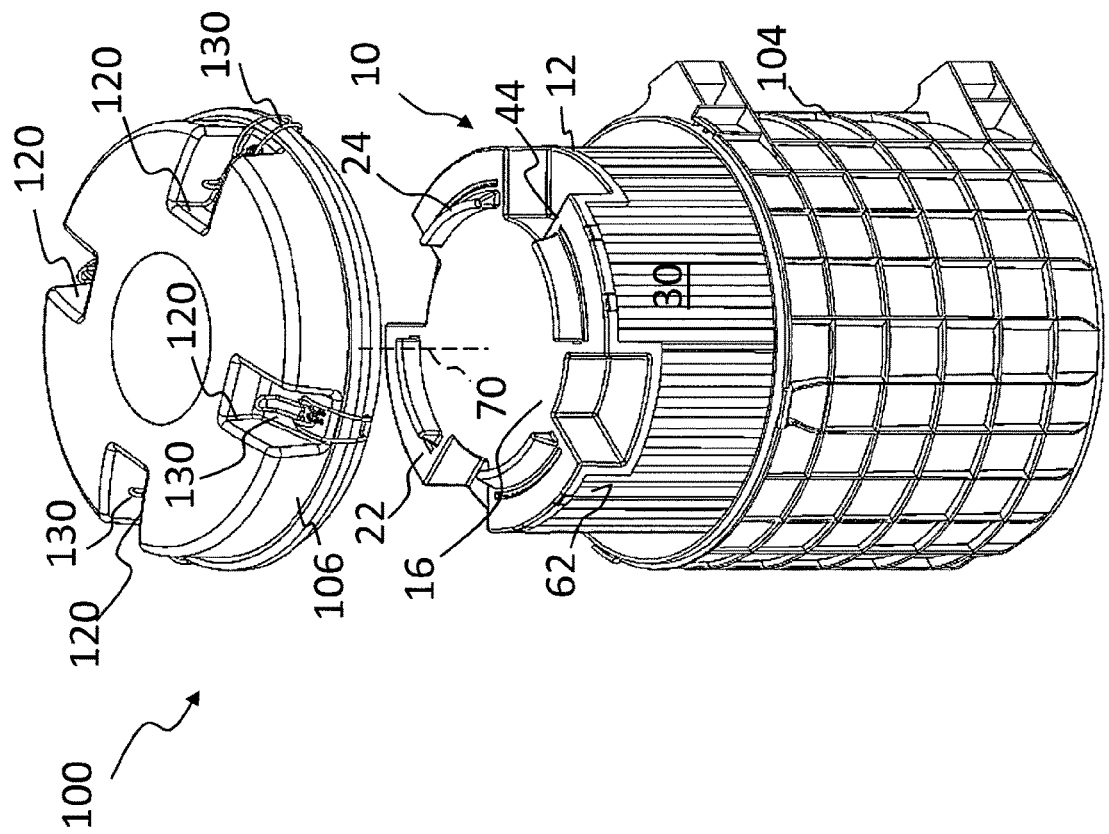
FIG. 2 shows the filter system of FIG. 1 in exploded illustration.

In the Figures, same or same type components are identified with same reference characters. The Figures show only examples and are not to be understood as limiting.

Figure 1:
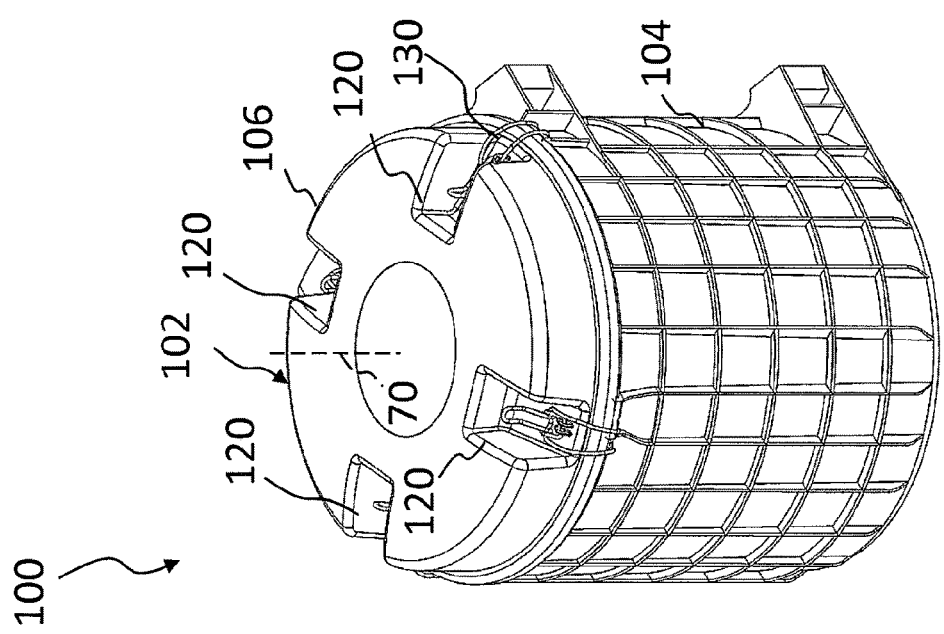
FIG. 1 shows an isometric view of a filter system with a filter element according to an embodiment of the invention.
Figure 6:
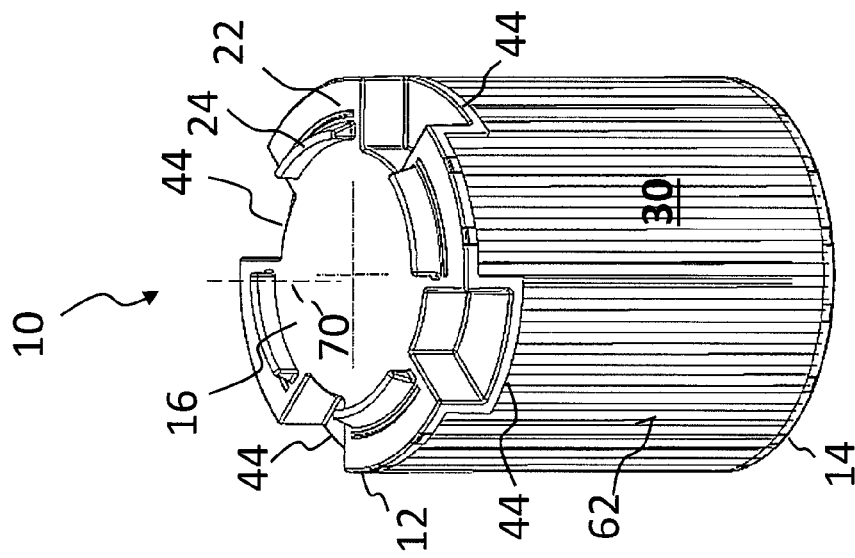
FIG. 6 shows the filter element of FIG. 1 in isometric view.
Figure 5:
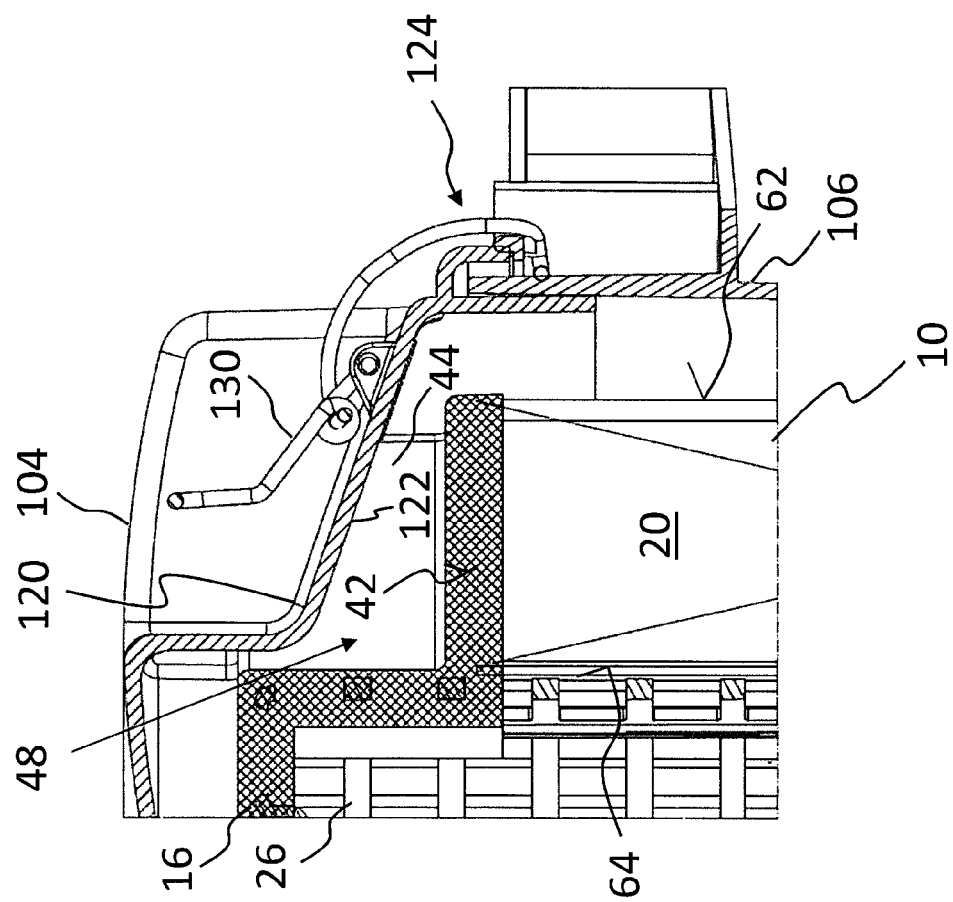
FIG. 5 shows a detail of the filter system of FIG. 1 in an enlarged illustration corresponding to the detail V in FIG. 4.

FIGS. 1 to 6 show different views of a filter system 100 with a filter element 10 according to an embodiment of the invention. In this context, FIG. 1 shows an isometric view of the filter system 100, FIG. 2 the filter system 100 in exploded illustration, FIG. 3 the filter system 100 in a plan view, FIG. 4 the filter system 100 as a longitudinal section, FIG. 5 a detail of the filter system 100 in enlarged illustration, and FIG. 6 an isometric illustration of the filter element 10.

The filter system 100 comprises a housing 102 in which a cylindrical filter element 10 is arranged. The housing 102 comprises a first housing part 104, for example, a housing cover, and a second housing part 106, for example, a housing pot. An inlet 108 (FIG. 3), for example, tangentially arranged, and an outlet 110 for a fluid, for example, concentrically arranged, are arranged at the second housing part 106. In this embodiment, the flow of the fluid through the filter element 10 is realized in radial direction from an outer circumference 62, corresponding to the inflow side 62, to an inner circumference 64, corresponding to the outflow side.

The filter element 10 arranged in the housing 102 is comprised of a filter bellows 30 of a filter medium 20 which is laid in folds, in particular in a zigzag shape, along fold edges in the filter bellows 30. The filter bellows 30 is arranged in a closed configuration about a longitudinal axis 70 and surrounds a support tube 26. The two end faces 12, 14 are sealed by an end disc 16, 18, respectively (FIG. 4). The end disc 16 which is facing the first housing part 104 is embodied closed at the end face 12 and is arranged at the side of the housing 102 remote from the concentric outlet 110.

A separation plane 124 between first and second housing parts 104, 106 is arranged substantially at the axial level of the end disc 16 of the filter element 10 which comprises, at its end face 12, regions 48 with cutouts 44 in the filter bellows 30. Closure elements 130 with which the first housing part 104 is connected to the second housing part 106 are then easily accessible for an operator.

The cutouts 44 in the filter bellows 30 of the filter element 10 form a recessed portion of the end edges 36 (FIGS. 7, 8) of the folds 46 in the filter bellows 30 in the direction of the longitudinal axis 70. The support tube 26 extends within the filter bellows 30 across the entire axial extension of the latter and is embedded at the end faces 12, 14 in the end discs 16, 18.

The end disc 16, which is preferably comprised of PUR foam, replicates in complementary shape the cutouts 44. In this embodiment, the end edges of the folds 46 of the filter bellows 30 in the cutouts 44 are positioned in a planar surface 42. At the end face 22 of the end disc 16 as well as at the oppositely positioned end disc 18, support ribs 24, 28 are arranged with which the filter element 10 is axially clamped between the two housing parts 104, 106 in the conventional way. For example, four equidistant cutouts 44 are arranged at the filter element 10.

In an embodiment which is not illustrated, it can optionally be provided that support elements in the region of the cutouts 44 are arranged on the end disc 16. In addition, a support surface can be arranged for this purpose at the bulge at the corresponding housing part 104.

In accordance with the arrangement of the cutouts 44 in the filter element 10, the first housing part 104, viewed from the exterior, has corresponding recesses 120. Viewed from the inner side of the housing part 104, the recesses 120 form bulges 122 which engage the cutouts 44. In this context, a free space between the bulges 122 in the first housing part and the cutouts 44 in the filter element 10 may remain.

In the exterior recesses 120 of the first housing part 104, a closure element 130 is arranged that in particular is embodied as a wire clasp closure. The movable part of the closure element 130, here the pivotable bracket, dips in the closed state of the housing 102 into the recess 120 in a space-saving way while the locking bracket is fixed at a counter element of the second housing part that is not identified here.

Figure 8:
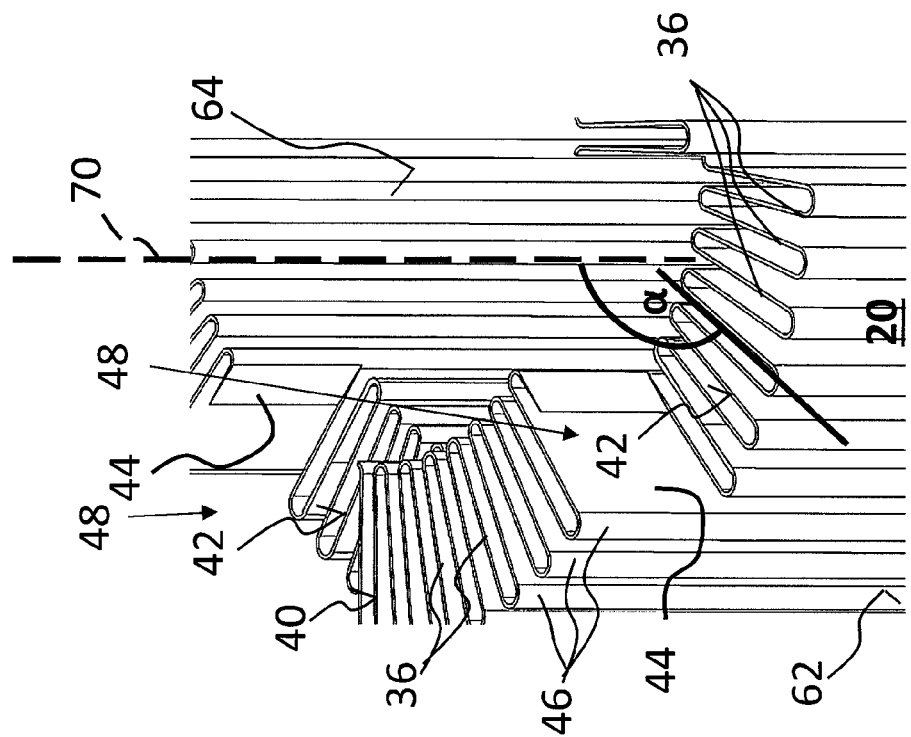
FIG. 8 shows an enlarged detail of the filter bellows of FIG. 7.
Figure 7:
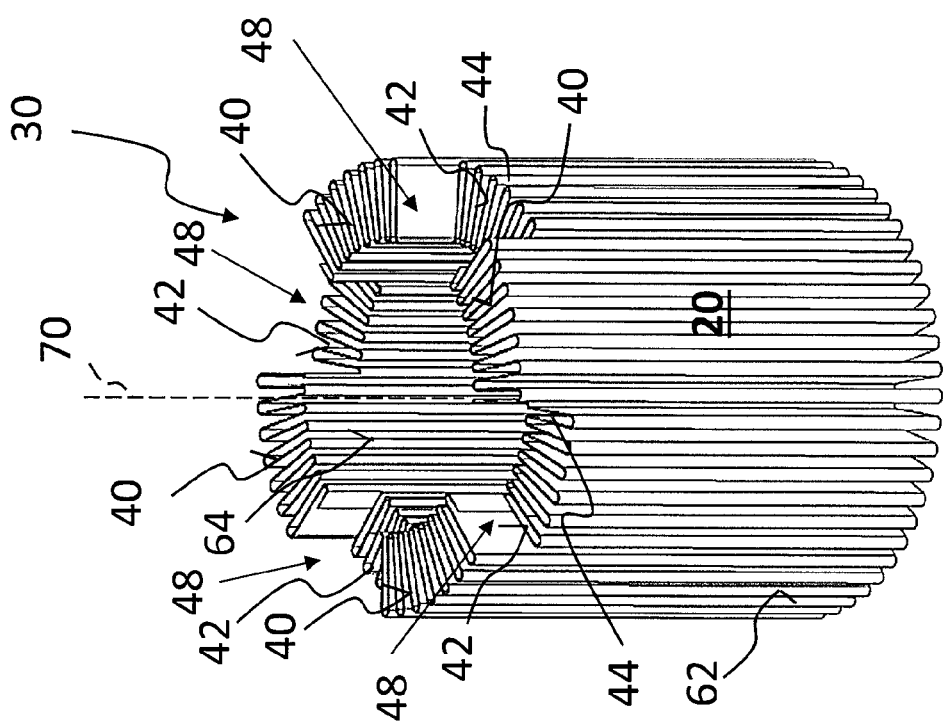
FIG. 7 shows an isometric view of a filter bellows according to an embodiment of the invention.
Figure 9:
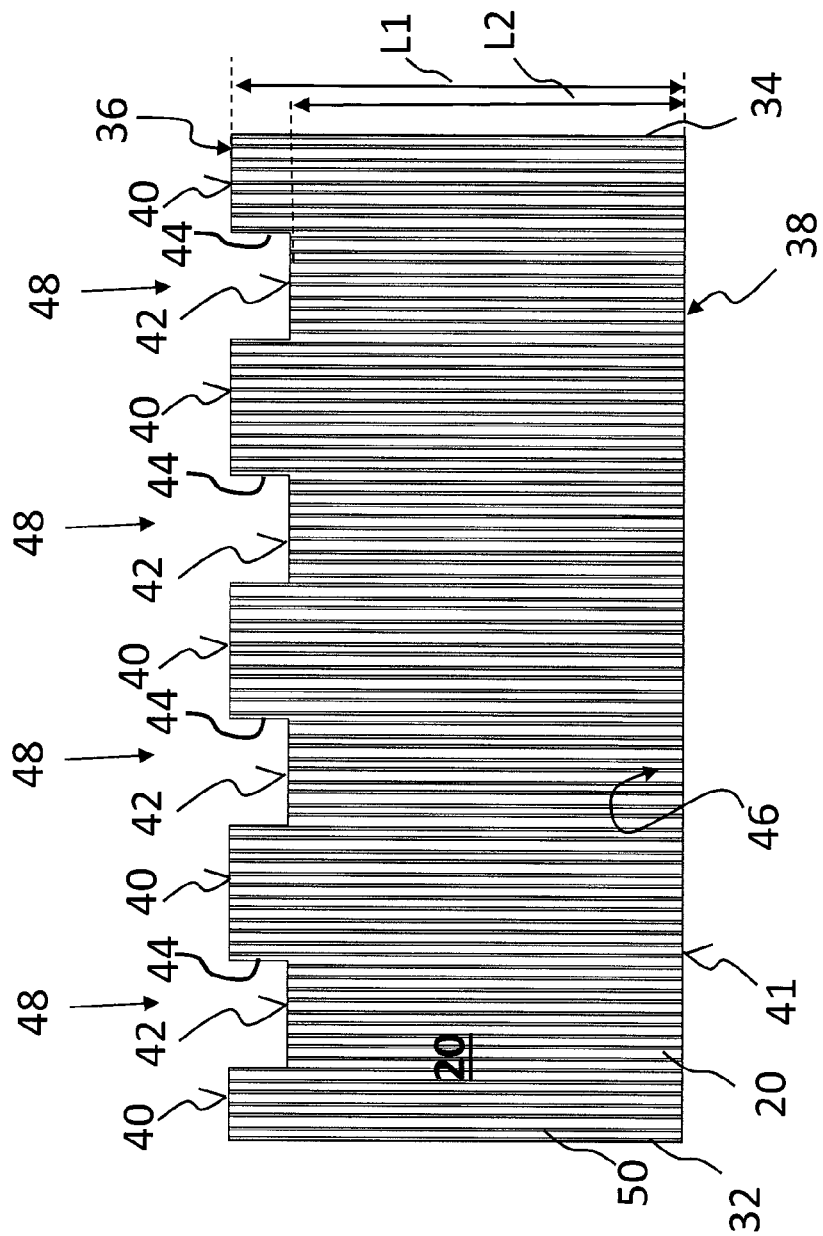
FIG. 9 shows the filter bellows of FIG. 7 in developed illustration.

FIGS. 7 to 9 show different views of a filter bellows according to an embodiment of the invention. FIG. 7 shows an isometric view of the filter bellows 30, FIG. 8 an enlarged detail of the filter bellows 30, and FIG. 9 the filter bellows 30 in developed illustration.

The filter bellows 30 is formed of a filter medium 20 which is laid into folds 46 whose fold edges 50 extend between end edges 36 and 38. In the developed form, the filter bellows 30 at both ends has end folds 32, 34 which are connected to each other in order to form the filter bellows 30 with closed cross section as a round element. The folds 46 between the end edge surfaces 40, 41 have a fold length L1. For better clarity, only some of the fold edges 50, end edges 36, 38, and folds 46 are identified by reference characters.

In this embodiment of the invention, the filter bellows 30 has at an end face a cut portion so that four equidistant regions 48 are formed in which folds 46 have a shortened fold length L2, wherein the fold length L2 at both sides of the filter medium 20 in accordance with the inflow surface (outer circumference 62) and the outflow surface (inner circumference 64) are identical or at least substantially identical.

The regions 48 have rectangular cutouts 44. The cut portion of the filter bellows 30 is configured such that the end edges 36 of the folds 46 in each region 48 extend perpendicular to the longitudinal axis 70 of the filter bellows 30, i.e., the angle α between longitudinal axis 70 and the end edges 36 is α=90°. The end edges 36 in the region 48 end in a surface 42 which is planar and oriented perpendicular to the longitudinal axis 70.

Figure 11:
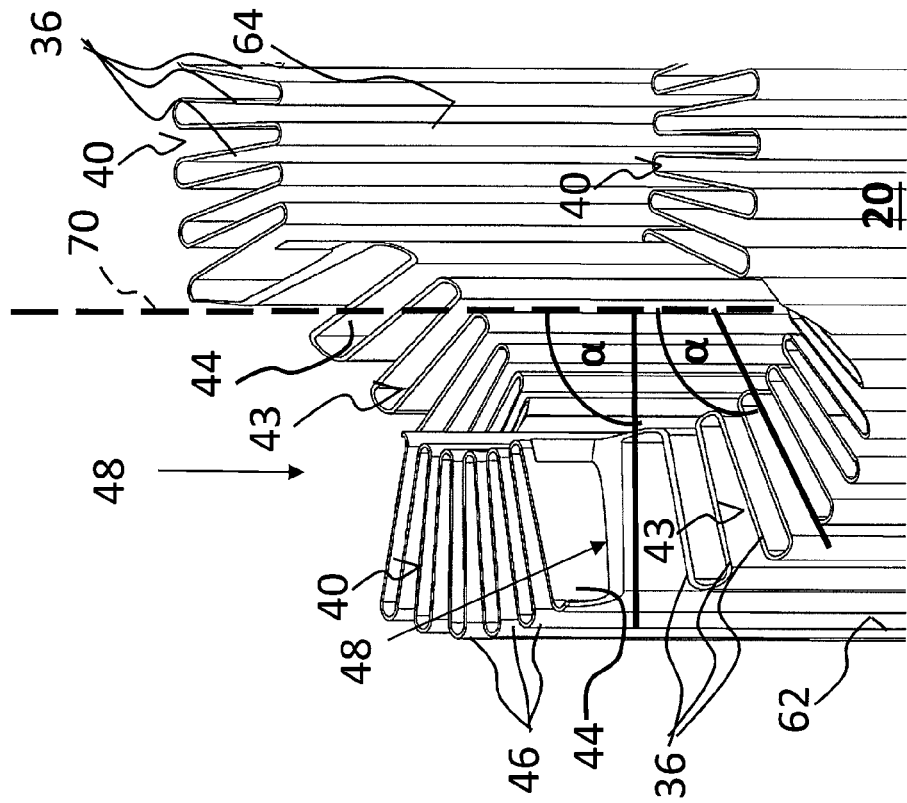
FIG. 11 shows an enlarged detail of a filter bellows of FIG. 10.
Figure 10:
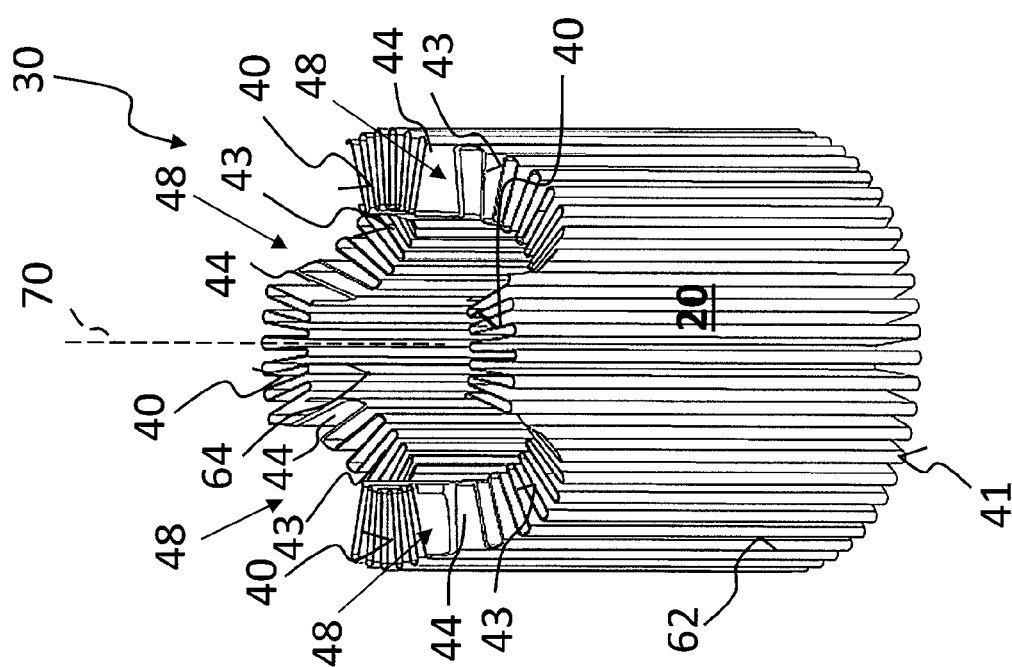
FIG. 10 shows an isometric view of a filter bellows according to a further embodiment of the invention.
Figure 12:
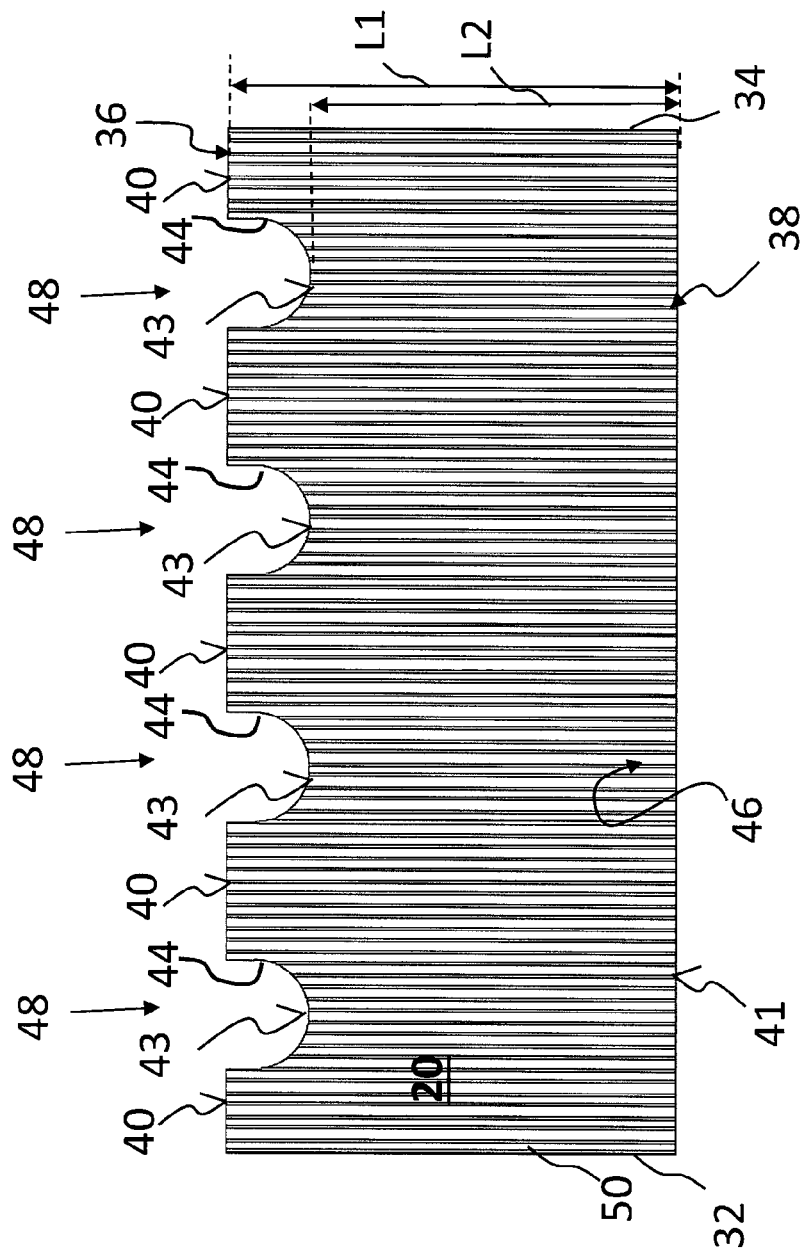
FIG. 12 shows the filter bellows of FIG. 10 in developed illustration.

The FIGS. 10 to 12 show different views of a filter bellows 30 according to a further embodiment of the invention. In this context, FIG. 10 shows an isometric view of the filter bellows 30, FIG. 11 an enlarged detail of the filter bellows 30, and FIG. 12 the filter bellows 30 in developed illustration.

The configuration of the filter bellows 30 corresponds to that in the embodiment of FIGS. 7 to 9 and reference is being had to its description for avoiding unnecessary repetitions.

The four equidistant regions 48 comprise concavely embodied cutouts 44 in which the end edges 36 in the region 48 end in a curved surface 43 which is a cylinder section whose axis of symmetry extends perpendicular to the longitudinal axis 70. The cut portion of the filter bellows 30 is embodied such that end edges 36 of the folds 46 are oriented in the region 48 perpendicular to the longitudinal axis 70 of the filter bellows 30, i.e., the angle α between longitudinal axis 70 and the end edges 36 is α=90°. The length of the folds 46 in the regions 48 varies due to the curvature of the surface 43 with a minimal fold length L2 at the minimum of the cutouts 44.

Figure 14:
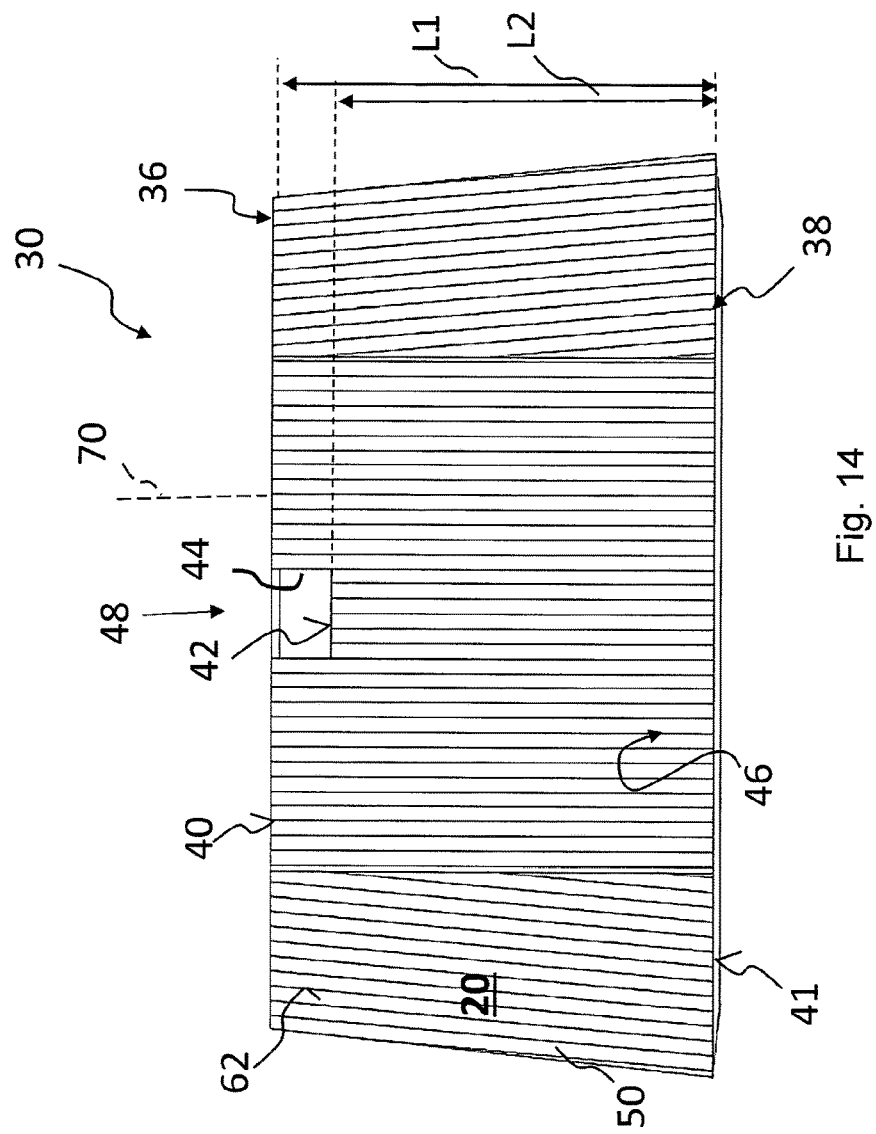
FIG. 14 shows a side view of the filter bellows of FIG. 13.
Figure 13:
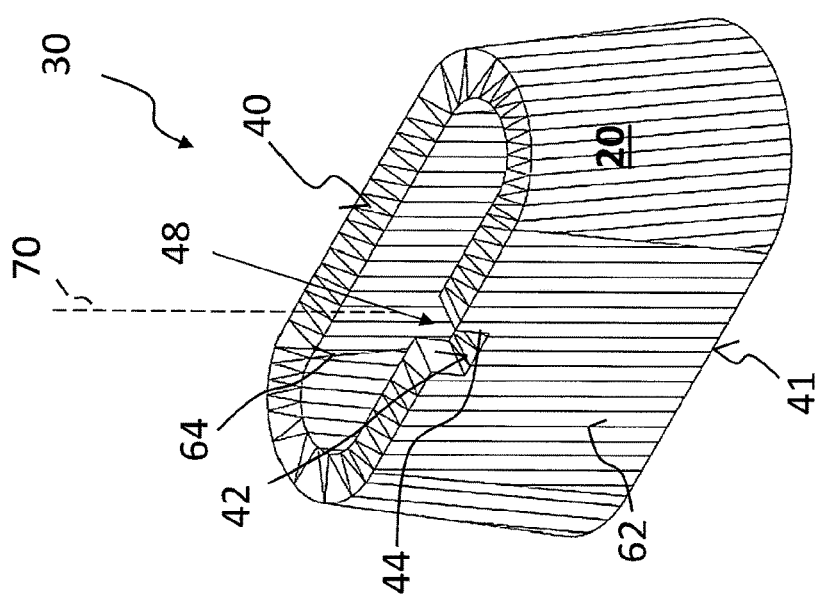
FIG. 13 shows an isometric view of a filter bellows according to a further embodiment of the invention with oval cross section and a cutout in a lateral region with minimal curvature.

FIGS. 13 and 14 show views of the filter bellows 30 according to a further embodiment of the invention. FIG. 13 shows an isometric view and FIG. 14 shows a side view of the filter bellows 30.

The filter bellows 30 comprises an oval cross-section wherein a rectangular cutout 44 is arranged in a flank of the filter bellows 30 with minimal curvature. The cross section is larger at an end face of the filter bellows 30 than at the oppositely positioned end face. Within the cutout 44, the folds 46 have a shortened fold length L2. The end edges 36 of the folds 46 are positioned in a planar surface 42 wherein the end edges 36 in the surface 42 and the surface 42 itself are oriented perpendicular to the longitudinal axis 70.

Figure 16:
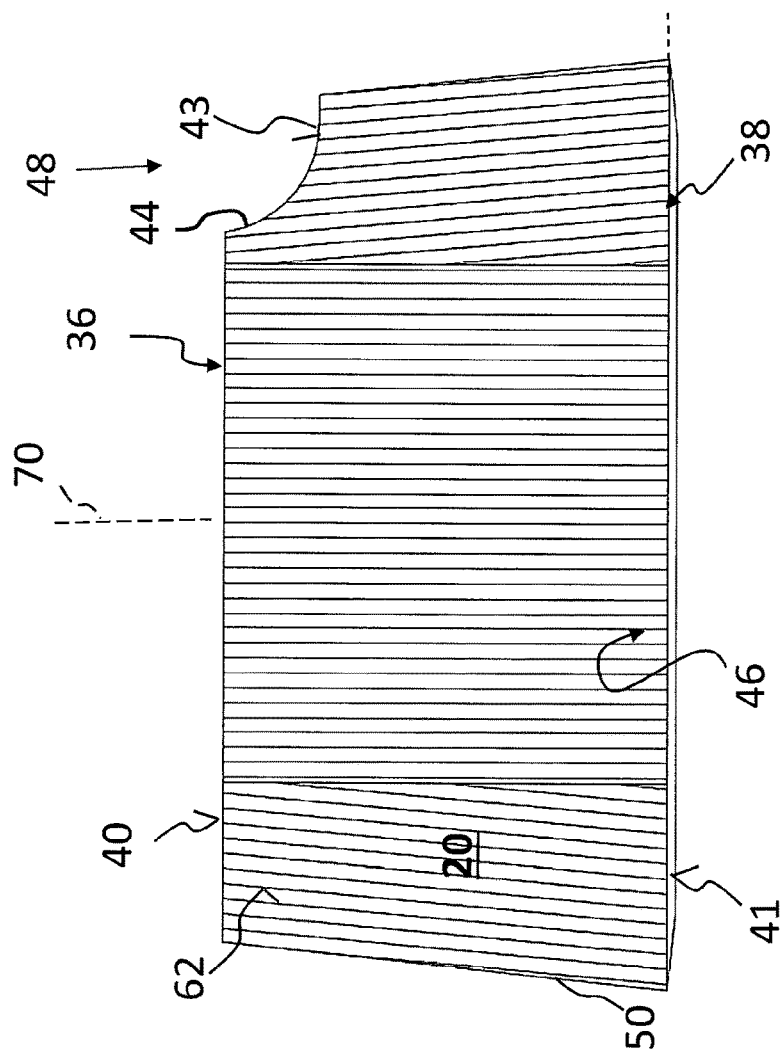
FIG. 16 shows a side view of the filter element of FIG. 15 with oval filter bellows.
Figure 15:
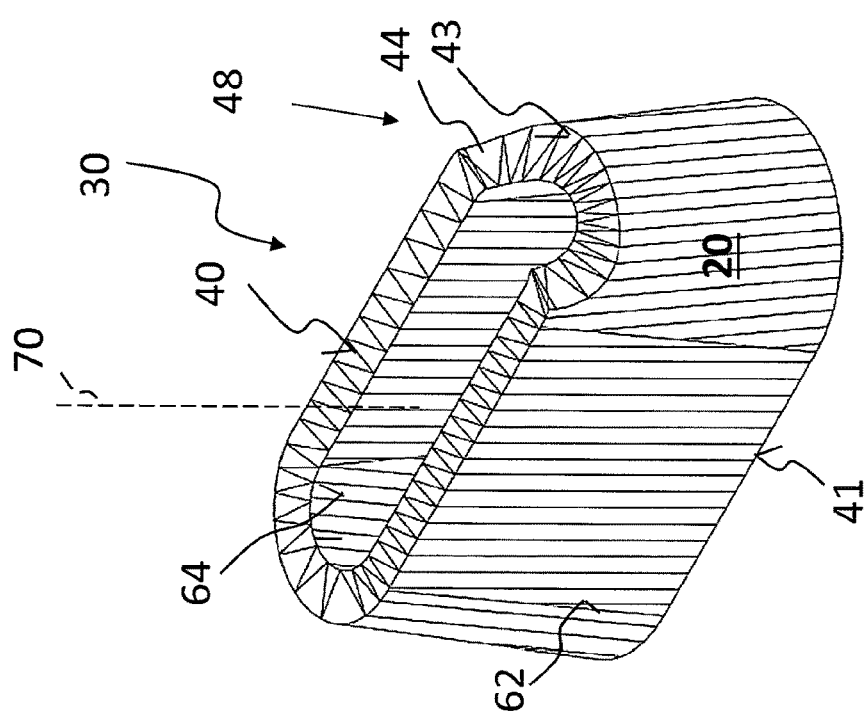
FIG. 15 shows an isometric view of a filter bellows according to a further embodiment of the invention with oval cross section and a cutout in a lateral region with strong curvature.

The FIGS. 15 and 16 show views of a filter bellows 30 according to a further embodiment of the invention. FIG. 15 shows an isometric view and FIG. 16 a side view of the filter bellows 30.

The filter bellows 30 comprises an oval cross section wherein a concave cutout 44 is arranged in a flank of the filter bellows 30 with strong curvature. The cross section is larger at an end face of the filter bellows 30 than at the oppositely positioned end face. Within the cutout 44, the folds 46 have a shortened fold length which, beginning at the end edge surface 40, drops to a minimum value at the middle of the cutout 44. The end edges 36 of the folds 46 are positioned in a curved surface 43 wherein the end edges 36 in the curved surface 43 are oriented perpendicular to the longitudinal axis 70.

In all embodiments, it can be optionally provided that a segment of end edges 36 within one or a plurality of regions 48 comprises an angle α≠90° relative to the longitudinal axis 70 (not illustrated).

What is claimed is:

1. A filter element comprising:
    a round filter bellows comprising a filter medium laid into folds along fold edges in the filter bellows,
    wherein the folds extend axially relative to a longitudinal axis between axially oppositely positioned end edges of the filter bellows, respectively,
    wherein the end edges form oppositely positioned end edge surfaces;
    wherein the filter bellows is arranged in a closed configuration about the longitudinal axis and encloses a hollow space;
    wherein the filter bellows comprises two axially opposed end faces sealed by an end disc, respectively;
    wherein the filter bellows comprises
        a cut portion in at least one of the oppositely positioned end edge surfaces such that the cut portion forms a shortened fold length region of folds having a shortened fold length,
    wherein a fold length of the folds with shortened fold length is substantially identical at an outer circumference and at an inner circumference of the filter bellows,
    wherein the shortened fold length folds have axial end edges at the cut portion that extend perpendicular to the longitudinal axis from the outer circumference to the inner circumference of the filter bellows.
2. The filter element according to claim 1, wherein,
    the shortened fold length folds have end edges at the cut portion which define and lie on a planar surface.
3. The filter element according to claim 2, wherein
    the cut portion is a cutout with a planar bottom and the cutout extends away from the at least one oppositely positioned end edge surface having the cut portion,
    wherein the axial end edges of the folds with shortened fold length are positioned at the planar bottom forming the planar surface arranged perpendicular to the longitudinal axis.
4. The filter element according to claim 1, wherein,
    in one or more regions of folds with shortened fold length, the axial end edges of the folds with shortened fold length are positioned in a curved surface.
5. The filter element according to claim 2, wherein
    the cut portion is a concave cutout provided with the curved surface and the concave cutout extends away from the at least one oppositely positioned end edge surface,
    wherein the axial end edges of the folds with shortened fold length are positioned in the curved surface of the concave cutout.
6. The filter element according to claim 1, wherein
    one or more shortened fold length region of folds having a shortened fold length and regions with folds with unshortened fold length follow each other alternatingly in the circumferential direction of the filter bellows.

7. The filter element according to claim 1, wherein
the cut portion is a single cutout arranged within the medium in the filter bellows and forming the region with folds with shortened fold length.
8. The filter element according to claim 1, wherein
the filter bellows comprises an annular cross section.
9. The filter element according to claim 1, wherein
the filter bellows comprises an oval cross section.
10. The filter element according to claim 1, wherein
the folds of the filter bellows are folded in a zigzag shape.
11. A filter system comprising:
a housing comprising
an inlet and an outlet for a fluid,
wherein the housing comprises
a first housing part and a second housing part;
the filter element according to claim 1 arranged in the housing,
wherein the filter element comprises
two opposed end faces sealed by an end disc, respectively;
wherein at least one of the first and second housing parts comprises
at least one region that is embodied corresponding to the cut portion of the filter bellows of the filter element.
12. The filter system according to claim 11, further comprising
a support tube comprising
along a circumference thereof a constant axial extension,
wherein the filter element is arranged about the support tube.
13. The filter system according to claim 12, wherein
the support tube is unshortened in one or more regions with folds with shortened fold length.
14. The filter system according to claim 11, wherein
one of the end discs of the filter bellows is a closed end disc,
wherein the cut portion is arranged at an end of the filter element provided with the closed end disc.
15. The filter system according to claim 11, wherein
one of the end discs of the filter bellows is an open end disc,
wherein the cut portion is arranged at an end of the filter element provided with the open end disc.
16. The filter system according to claim 11, wherein
the first housing part is facing the cut portion of the filter bellows of the filter element,
wherein the first housing part comprises at least one bulge at an inner side of the first housing part,
wherein the at least one bulge forms said at least one region that is embodied corresponding to the cut portion of the filter bellows of the filter element,
wherein the cut portion comprises at least one cutout, and
wherein the at least one bulge engages the at least one cutout.
17. The filter system according to claim 11, wherein
the first housing part comprises
an exterior recess which forms a corresponding interior bulge inside the first housing part,
wherein the housing further comprises
a closure element arranged in the exterior recess,
wherein the closure element dips substantially into the exterior recess in a closed state of the housing.
18. The filter system according to claim 17, wherein
the closure element is a snap hook.
19. The filter system according to claim 11, wherein
a separation plane between the first housing part and the second housing part is arranged substantially at an axial level of the cut portion in the filter bellows of the filter element.
20. The filter system according to claim 11, configured as an air filter or a liquid filter for an internal combustion engine.
21. The filter system according to claim 11, configured as a round filter for an internal combustion engine.

* * * * *